United States Patent [19]

Kawabata

[11] Patent Number: 5,074,569
[45] Date of Patent: Dec. 24, 1991

[54] HEIGHT CONTROL IN ACTIVE SUSPENSION SYSTEM

[75] Inventor: Kazunobu Kawabata, Kanagawa, Japan

[73] Assignee: Nissan Motor Company, Limited, Yokohama, Japan

[21] Appl. No.: 509,358

[22] Filed: Apr. 17, 1990

[30] Foreign Application Priority Data

Apr. 20, 1989 [JP] Japan .................. 1-100821

[51] Int. Cl.⁵ .......................................... B60G 17/015
[52] U.S. Cl. .................... 280/6.12; 280/707; 364/424.05
[58] Field of Search ............... 364/424.05; 280/707, 280/702, DIG. 1, 714, 840, 6.12

[56] References Cited

U.S. PATENT DOCUMENTS

| 4,789,935 | 12/1988 | Buma et al. | 364/424.05 |
|---|---|---|---|
| 4,801,155 | 1/1989 | Fukushima | 280/707 |
| 4,848,790 | 7/1989 | Fukunaga et al. | 280/707 |
| 4,865,348 | 9/1989 | Hano et al. | 280/707 |
| 4,877,263 | 10/1989 | Konishi et al. | 280/707 |
| 4,888,696 | 12/1989 | Akatsu | 364/424.05 |
| 4,903,983 | 2/1990 | Fukushima et al. | 280/707 |
| 4,905,152 | 2/1990 | Kawabata | 364/424.05 |
| 4,909,534 | 3/1990 | Fukushima | 280/707 |
| 4,911,468 | 3/1990 | Fukunaga | 280/707 |
| 4,911,469 | 3/1990 | Kawarasaki | 280/707 |
| 4,911,470 | 3/1991 | Fukunaga | 280/707 |
| 4,919,440 | 4/1990 | Tsukamoto | 280/707 |
| 4,938,499 | 7/1990 | Kawabata | 280/707 |
| 4,948,165 | 8/1990 | Takahashi | 280/707 |
| 4,961,595 | 10/1990 | Fukushima | 280/772 |
| 4,967,360 | 10/1990 | Fukunaga | 364/424.05 |
| 4,973,079 | 11/1990 | Tsukamoto | 280/707 |
| 4,982,979 | 1/1991 | Akatsu | 280/707 |

FOREIGN PATENT DOCUMENTS

| 3819839 | 12/1988 | Fed. Rep. of Germany . | |
| 56-167510 | 12/1981 | Japan | 280/707 |
| 2145984 | 4/1985 | United Kingdom . | |

Primary Examiner—Charles A. Marmor
Assistant Examiner—Karin Tyson
Attorney, Agent, or Firm—Foley & Lardner

[57] ABSTRACT

An active suspension system derives a target pressure to adjust fluid pressure in a working chamber of an active cylinder on the basis of a difference between an actual height level and a desired or target vehicular height level. Pressure supply for the working chamber is so controlled as to establish the target height. The system detects a vehicular parking state in which the vehicle speed is zero and a road wheel is locked and limits the variation range of the fluid pressure in the working chamber at the target pressure.

14 Claims, 4 Drawing Sheets

HEIGHT CONTROL IN ACTIVE SUSPENSION SYSTEM

BACKGROUND OF THE INVENTION

1. Field of the Invention

The present invention relates generally to an active suspension system for an automotive vehicle. More specifically, the invention relates to a vehicular height regulation system in the active suspension system with a feature of the prevention of overshooting of a pressure supply leading to unexpected height variations of the vehicle.

2. Description of the Background Art

In general, active suspension systems form a current trend in the automotive technologies for greater capability of adjustment of suspension characteristics, such as vehicular attitude change suppressive capability, height regulating capability, shock absorbing capability and so forth. Japanese Patent First (unexamined) Publication (Tokkai) Showa 61-263818 discloses height adjustment technology for active suspension system. The disclosed systems utilizes a fluid pressure in an active cylinder disposed between a vehicular body and a suspension member, such as suspension arm, suspension link or so forth, for adjustment of the vehicular height level. In general, height adjustment for the vehicle body is performed so as to maintain a relative distance between the vehicular body and the suspension member within a desired height range.

In general, height adjustment toward the desired height range is performed by monitoring an actual vehicular height from the road surface or from the axle of the road wheel in a feedback manner. The fluid pressure in a working chamber of the active cylinder is continuously or cyclically adjusted for establishing the vehicular height within the desired height range. Therefore, height adjustment can be continued until the desired range of vehicular height is established.

As can be appreciated, the suspension member is pivotably connected to the vehicular body for permitting movement of the vehicular body and the suspension member relative to the other in bounding and rebounding motion. Pivotal movement of the suspension member relative to the vehicle body for varying vertical the positional relationship between the vehicular body and a road wheel rotatably mounted on the suspension member, necessarily causes horizontal or axial displacement of the road wheel relative to the pivoting point on the vehicular body. For instance, when the vehicular height level is to be raised, a respective suspension member pivotally moves to cause displacement of the vehicular body and/or the respective road wheel away from each other. This movement necessarily leads to axial displacement of the road wheels toward the pivot points of the associated suspension members. In other words, unless axial displacement of the road wheel relative to the pivot point of the suspension member on the vehicle body is permitted, the relative vertical distance between the vehicular body and the road wheel will never change irrespective of the pressure level in the working chamber of the active cylinder.

It is sometimes necessary to effect height adjustment when a vehicle is in a parking state, in such an occasion that vehicular load is changed due to the boarding or deboarding of passengers or the loading or unloading of luggage, for example. Since the active suspension system is normally maintained is an active state as long as the main power switch, i.e. an ignition switch, is held ON, when the vehicular height is changed out of the desired height range, a height adjustment function of the active suspension system is triggered to perform a height adjustment operation. If the height adjustment takes while all the road wheels are locked by application of a brake, for example, fluid pressure in the working chamber of the active cylinder is adjusted for causing height variation toward the desired height range. However, no significant or noticeable change of actual vehicular body height is realized, due to the locked state of the road wheels. This may cause continuous adjustment of the fluid pressure in the working chamber so that the fluid pressure becomes excessively high or low. In such a cause, if the brake is released, the road wheels are no longer braked and thus are permitted to move in an axial direction, causing an axial displacement relative to the pivot point of the suspension member. At this time, since the fluid pressure in the working chamber is excessively high, an unexpectedly rapid change of the vehicular height is caused upon releasing of the brake. This can surprise the driver and passengers and causes degradation of riding comfort.

SUMMARY OF THE INVENTION

Therefore, it is an object of the present invention to provide an active suspension system which can solve the aforementioned drawback in the prior art.

In order to accomplish the aforementioned object, an active suspension system, according to the present invention, derives a target pressure to adjust fluid pressure in a working chamber of an active cylinder, on the basis of a difference between an actual height level and a desired or target vehicular height level. Pressure supply for the working chamber is so controlled as to establish the target height. The system detects a vehicular parking state wherein the vehicle speed is zero and a road wheel is locked to limit the variation range of the fluid pressure in the working chamber at the target pressure.

According to one aspect of the invention, an active suspension system includes: a hollow cylinder disposed between a vehicular body and a suspension member for rotatably supporting a road wheel, a piston being disposed within the hollow interior space of the and hollow cylinder for thrusting movement, the hollow cylinder and the piston being cooperative for defining a working chamber therein. A fluid circuit system includes a pressurized fluid source for supplying and draining pressurized fluid to and from the working chamber. A pressure control valve is connected to the working chamber for adjusting fluid pressure within the working chamber. First means are provided for monitoring vehicular height to produce a vehicular body height level to produce a first signal. Second means are provided for monitoring vehicular condition, in which a road wheel is locked rotation, to produce a second signal. A controlling means is provided for controlling the pressure control valve position to adjust the fluid pressure in the working chamber for adjusting the height of the vehicular body within a predetermined height range. The controlling means is responsive to the second signal to derive a pressure adjustment range on the basis of the second signal value and a target height level set within the predetermined height range, for adjusting the fluid pressure in the working chamber within the adjustment range.

The controlling means is responsive to termination of the second signal to control the pressure control valve for adjusting the vehicular height level within the predetermined height range after expiration of a predetermined period of time.

The second means may detect the vehicle condition, in which a vehicle speed is zero and a brake is applied to produce the second signal.

According to another aspect of the invention, a height control system for an automotive vehicle includes: a hollow cylinder disposed between a vehicular body, and a suspension member for rotatably supporting a road wheel. A piston is disposed within the hollow interior space of the hollow cylinder for thrusting movement, the hollow cylinder and the piston cooperating to define a working chamber therein. A fluid circuit system includes a pressurized fluid source for supplying and draining pressurized fluid to and from the working chamber. A pressure control valve is connected to the working chamber for adjusting fluid pressure within the working chamber. A first means is provided for monitoring vehicular height to produce a first signal indicative of a vehicular body height level. A second means is provided for monitoring a vehicular condition, in which a road wheel is locked, to produce a second signal. A controlling means, active in normal state mode under absence of the second signal, is provided for controlling the pressure control valve position to adjust the fluid pressure in the working chamber for adjusting the height level of the vehicular body within a predetermined height range. The controlling means is responsive to the second signal to be active in a parking state mode, to derive a pressure adjustment range on the basis of the second signal value and a target height level set within the predetermined height range, for adjusting the fluid pressure in the working chamber within the adjustment range.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
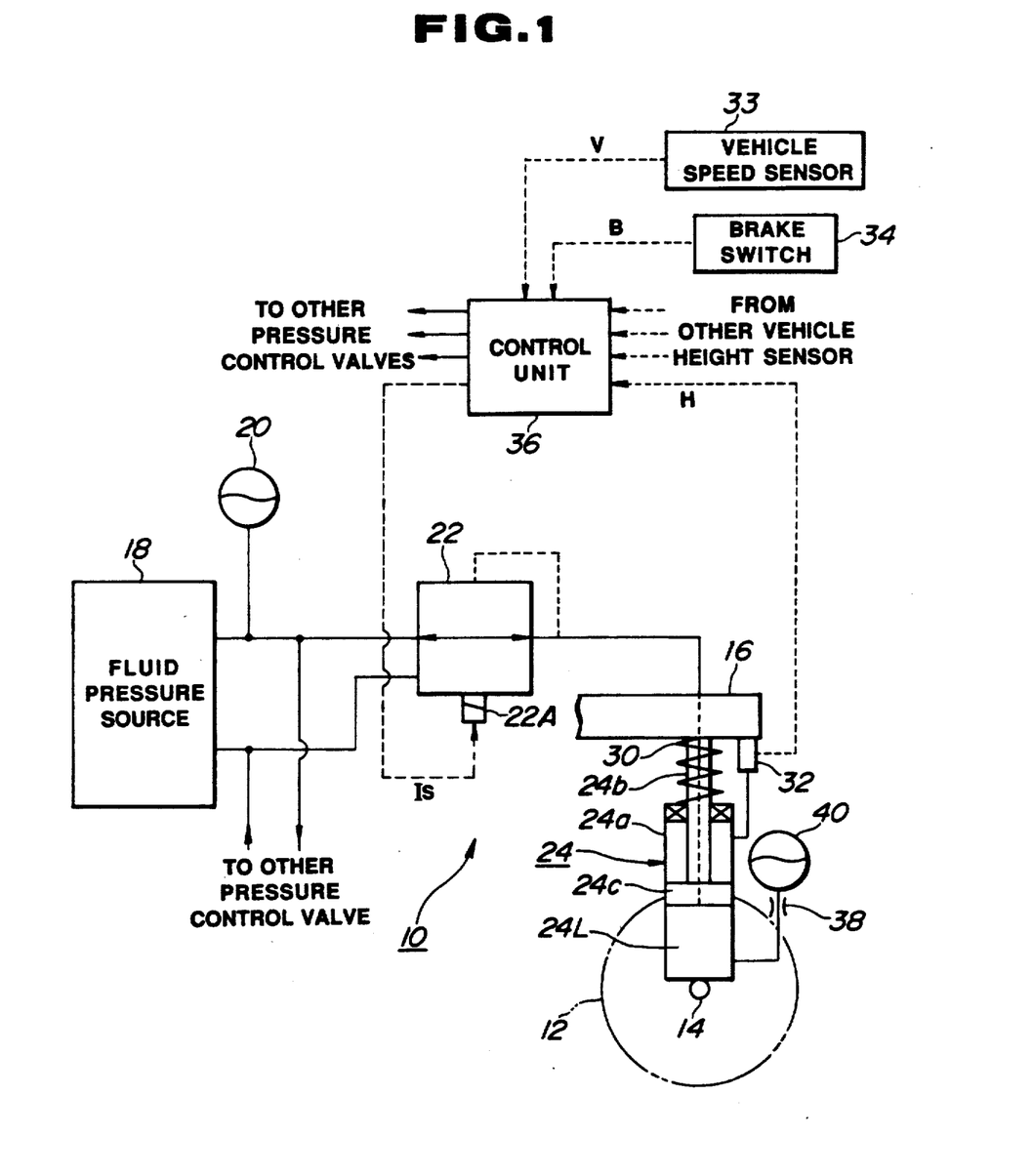
FIG. 1 is a block diagram of the preferred embodiment of an active suspension system according to the present invention.

Referring now to the drawings, particularly to FIG. 1, the preferred embodiment of an active suspension system, according to the present invention, is generally represented by the reference numeral 10. The suspension system comprises a road wheel 12 rotatably supported on a suspension member 14, and a vehicle body 16. An active cylinder 24 is disposed between the suspension member 14 and the vehicle body 16. The active cylinder 24 defines a working chamber 24L, in which working fluid pressure is adjusted for controlling suspension characteristics. A piston 24c is disposed in the interior space of a cylinder tube 24a of the active cylinder for defining the working chamber 24L set forth above. The piston 24c is connected to the vehicle body 16 via a piston rod 24b. A pressure accumulator 40 is connected the working chamber 24L via a flow restrictive orifice 38.

The working chamber 24L is connected to a fluid pressure source unit 18 via a supply line and a drain line. A pressure accumulator 20 is connected to the supply line for accumulating fluid pressure and thus regulating the line pressure. A pressure control valve 22 is disposed in the hydraulic circuit for controlling the introduction into and drainage from the working chamber 24L of the active cylinder. The pressure control valve 22 is associated with a proportioning solenoid 22a for controlling valve operation. The pressure control valve 22 can be constructed in various fashions. For example, any of the pressure control valves disclosed in the following prior proposed constructions of the valves will be applicable for the shown embodiment of the active suspension system.

A suspension coil 30 is disposed between the vehicle body 16 and the suspension member 14 in parallel with the active cylinder 24. The suspension coil 30 is designed to receive static load.

In order to control the proportioning solenoid 22a, a control unit 36 which comprises a microprocessor, is provided. The control unit 36, performs various suspension control operations, such as attitude change suppressive control, e.g. anti-rolling, and anti-pitching control, vehicular height regulating control, and so forth. For performing a suspension control operation, the control unit 36 is connected to various sensors monitoring suspension control parameters. Though the active suspension system according to the invention may perform attitude change suppressive controls and other various control, the following discussion will concentrate on height control.

In the shown embodiment, a vehicle speed sensor 33 for monitoring a vehicle speed to produce a vehicle speed indicative signal V, a brake switch 34 which detects active on condition of vehicular brake to produce a vehicular brake active state indicative signal B, and a vehicular height sensor 32 which monitors the vehicular height level to produce a height indicative signal H. In the shown embodiment, the brake switch 34 is designed to detect the active state of the foot brake and the parking brake to produce a HIGH level vehicular brake active state indicative signal when either of the foot brake or the parking brake is active. The control unit 36 processes the input signals from the sensors to derive a control signal for controlling the operation of the proportioning solenoid 22a for adjusting the vehicular height level within a predetermined target height range defined by an upper height limit $H_U$ and a lower height limit $H_L$. The control signal is a current signal commanding pressure to be established in the working chamber 24L. The relationship between the magnitude of current of the control signal and the fluid pressure in the working fluid is illustrated in FIG. 2.

Figure 2:
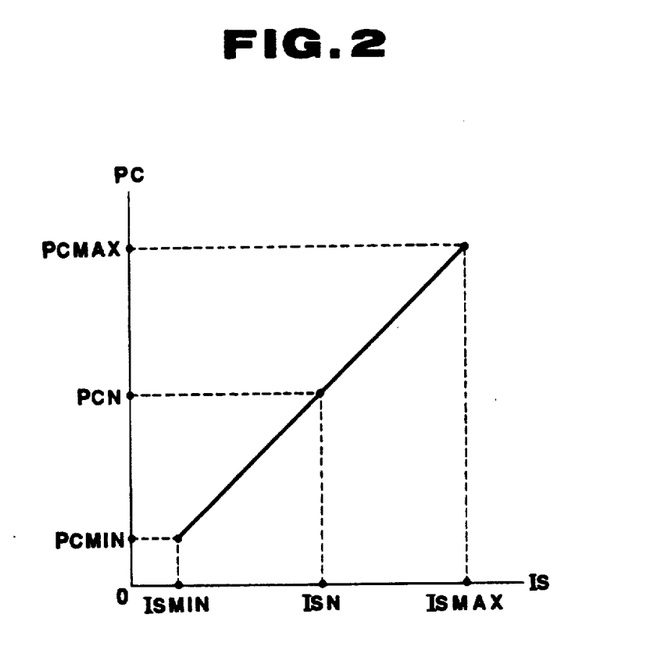
FIG. 2 is a chart showing the relationship between a control current and control pressure to be supplied to a working chamber in an active cylinder.

As can be seen from FIG. 2, the current level of the control signal varies between a maximum level $Is_{MAX}$ and a minimum level $Is_{MIN}$ across an intermediate neutral level $Is_N$. The maximum current level $Is_{MAX}$ corresponds to a maximum pressure $Pc_{MAX}$ of the control pressure and thus corresponds to the maximum pressure in the working chamber 24L. The minimum current level $Is_{MIN}$ corresponds to a minimum pressure $Pc_{MIN}$ and thus corresponds to the minimum pressure $Pc_{MIN}$. The fluid pressure in the working chamber 24L is thus varied across a neutral pressure $Pc_N$.

Figure 3:
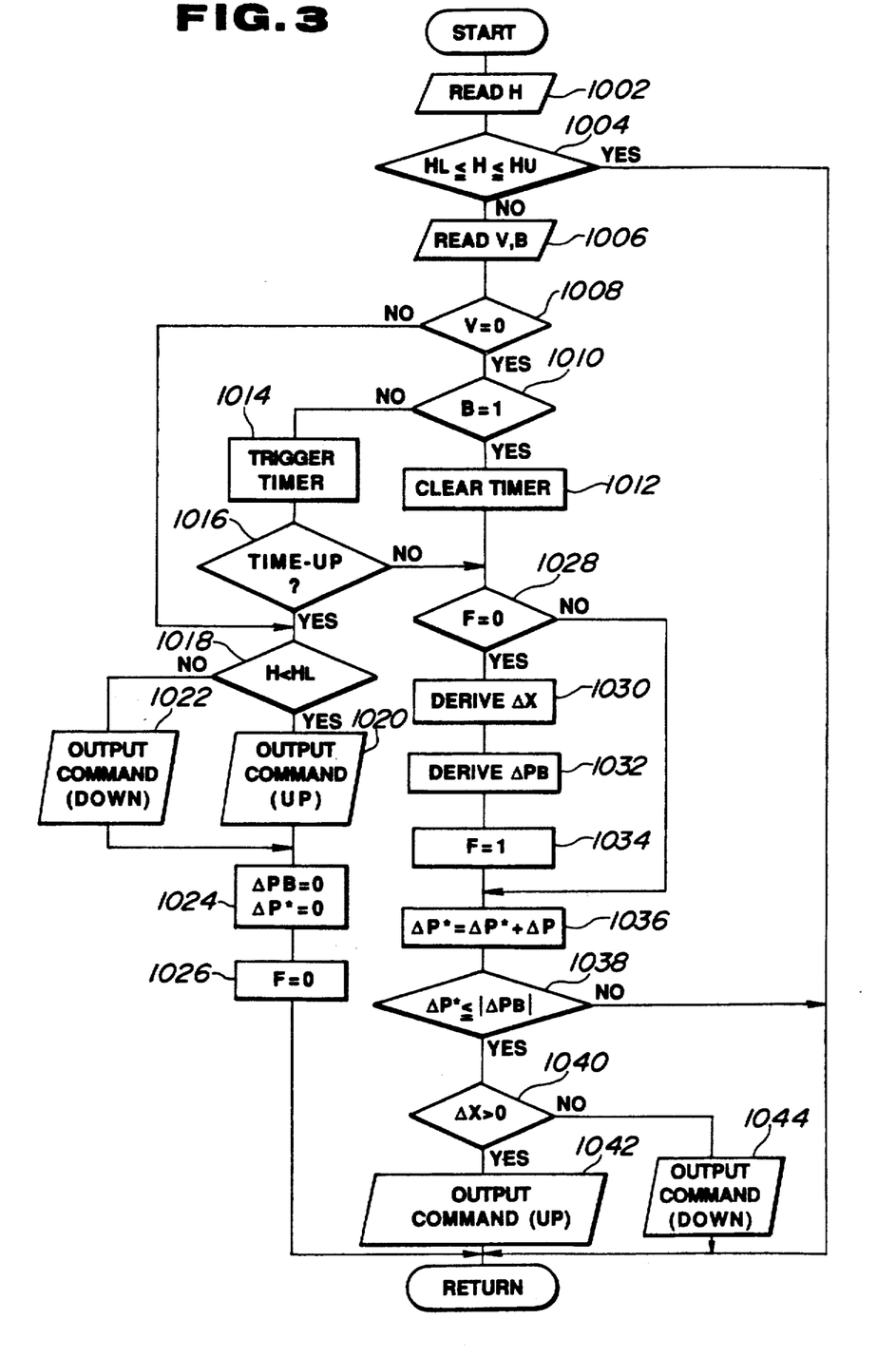
FIG. 3 is a flowchart showing a process of height control to be executed by a control unit in the active suspension system.

A process of height control operation performed by the shown embodiment of the active suspension system set forth above will be discussed herebelow with reference to FIG. 3. The shown process of height control operation will be initiated in response to the activation of a power supply, i.e. a turning ON of the ignition switch, and will be executed cyclically or periodically at predetermined interval, e.g. 20 msec.

Immediately after the process is started, the vehicular height indicative signal H of the vehicular height sensor 32 is read out at a step 1002. Then, the vehicular height indicative signal value H is compared with the upper limit value $H_U$ and the lower limit value $H_L$ which define the predetermined target height range, to check whether the vehicle body is within the predetermined height range, at a step 1004. When the vehicle height indicative signal value H, as checked at the step 1004, is smaller than or equal to the upper limit value $H_U$ and is greater than or equal to the lower limit value $H_L$, judgement can be made that the vehicle body is within the target height range. Then, the process directly ends and returns to a background job which governs various control routines.

On the other hand, if the vehicular height indicative signal value H is greater than the upper limit value $H_U$ or is smaller than the lower limit value $H_L$, as checked at the step 1004, the vehicle speed indicative signal value V and the braking state indicative signal B are read out at a step 1006. Then, the vehicle speed indicative signal value V is checked whether to determine the vehicle speed is zero or not at a step 1008.

When the vehicle speed indicative signal value V as checked at the step 1008 is zero, the braking state indicative signal level is checked at a step 1010. If the braking state indicative signal is a HIGH level, this indicating that the road wheel is locked by application of the brake, a timer is reset at a step 1012. On the other hand, if the braking state indicative signal level is LOW as checked at the step 1010, the timer is started to start measurement of an elapsed time at a step 1014. Thereafter, at a step 1016, the timer value is checked to determine whether the elapsed time indicated by the timer value is longer than a predetermined timer criterion, e.g. 2 sec. This step is provided for avoiding hunting during intermittent braking, such as when the brakes are being pumped, i.e. cyclically and rapidly applied and released. After the step 1016, process goes to a step 1018.

On the other hand, when the vehicle speed indicative signal value V is not zero as checked at the step 1008, the process goes directly to the step 1018.

If the elapsed time is longer than or equal to the timer criterion at step 1016, or after the speed zero determination is made in the step 1008, a check is performed to determine whether the vehicular height indicative signal value H is less than the lower limit value $H_L$, at the step 1018. If the answer at step 1018 is NO, this indicates that the vehicle height is greater than the lower limit value $H_L$.

If a YES determination is made at step 1018, an UP command is output to increase the fluid pressure in the working chamber 24L in a magnitude of $\Delta P$ at a step 1020. On the other hand, if a NO determination is made, indicating that the height indicative signal value H is greater than the upper limit value $H_L$, which means that the height level of the vehicular body is higher than the upper limit, a DOWN command is output to decrease the fluid pressure in the working chamber 24L in a magnitude of $\Delta P$ at a step 1022.

After processing one of the steps 1020 or 1022, the process goes to a step 1024. In the step 1024, a height error dependent control pressure $P_B$ and an accumulated pressure $\Delta P^*$, which will be discussed later, is cleared. Then, a flag F, the function of which will be discussed later, is reset at a step 1026. After the step 1026, the process ends and returns to the background job.

On the other hand, if the braking state indicative signal level as checked at the step 1010 yes and the timer is reset at the step 1012, or when the timer value as checked at the step 1016 is smaller than the timer criterion, the flag F is checked at a step 1028. If the flag F is not set as checked at the step 1028, a height error $\Delta x$ between the actual vehicular body height as represented by the vehicular height indicative signal H, and a target height $H_N$ which is set at a center value in the target height range, is derived by:

$$\Delta x = H_N - H \quad (1),$$

at a step 1030. Thereafter, a height error dependent control pressure $\Delta P_B$ which represents a magnitude of fluid pressure to be increased or decreased in the working chamber 24L of the active cylinder 24, is derived on the basis of the height error $\Delta x$ by the following equation at a step 1032.

$$\Delta P_B = (k \times \Delta x)/(A \times L) \quad (2)$$

wherein k is a spring coefficient of the suspension coil spring 30;

A is an effective area in the active cylinder 24; and

L is a lever ratio.

After the process performed at the step 1032, the flag F is set at a step 1034. Therefore, the flag F indicates states of control operations, in which the error dependent control pressure $\Delta P_B$ is already derived.

When the flag F as checked at the step 1028 is set or after the process proceeds through the steps 1030 through 1034, the accumulated pressure $\Delta P^*$ is derived at a step 1036. For deriving the accumulated pressure $\Delta P^*$, the following equation is used:

$$\Delta P^* = \Delta P^*(\text{old}) + \Delta P \quad (3)$$

As can be appreciated, the accumulated pressure $\Delta P^*$ is increased by the predetermined magnitude $\Delta P$ intermittently. The accumulated pressure $\Delta P^*$ represents an assumed or predicted pressure in the working chamber 24L after the pressure adjustment. The accumulated pressure $\Delta P^*$ is then compared with the absolute value $|\Delta P_B|$ of the error dependent control pressure, at a step 1038. If the accumulated pressure $\Delta P^*$ is smaller than or equal to the absolute value $|\Delta P_B|$ as checked at the step 1038, fluid pressure adjustment is permitted. On the other hand, if the accumulated pressure $\Delta P^*$ is greater than the absolute value $|\Delta P_B|$, fluid pressure adjustment is disabled. Therefore, in the latter case, the process directly goes END after the step 1038. On the other hand, when fluid pressure adjustment is permitted at the step 1038, the height error value Δx is checked at a step 1040 to determine whether the height error value is greater than zero. If the answer at the step 1040 is positive, then the UP command is output for increasing the control pressure by ΔP. On the other hand, if the answer at the step 1040 is negative, the DOWN command is output for decreasing the control pressure by ΔP.

Figure 4:
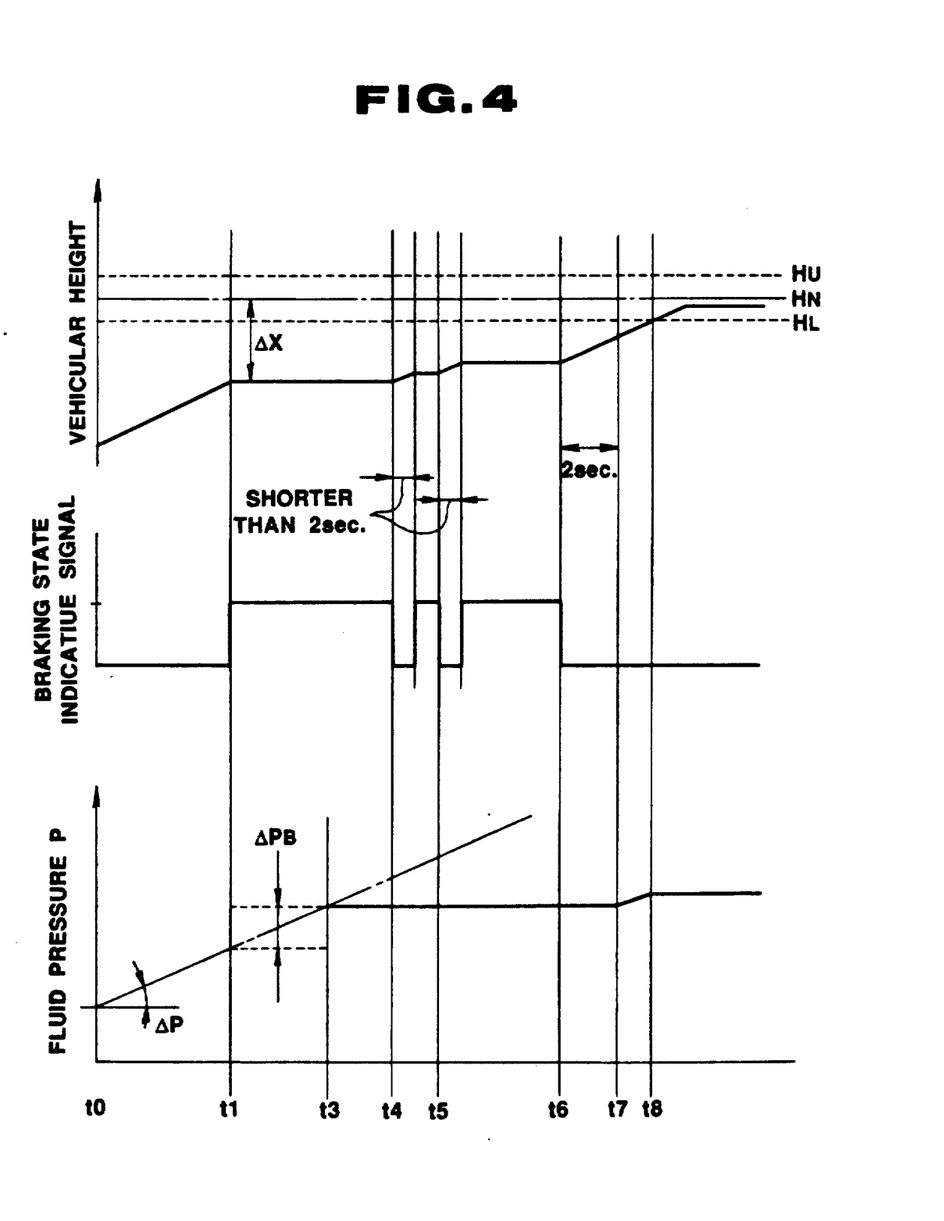
FIG. 4 is a timing chart showing an example of a height control operation performed in the active suspension system.

Practical control operation to be performed by the active suspension system set forth above will be discussed herebelow with reference to FIG. 4. In the timing chart shown in FIG. 4, variations of the vehicle speed V, the actual vehicular height H, and the braking state indicative signal B are illustrated.

It is assumed that the vehicle is in a parked state and the vehicular height is held lower than the lower limit, the vehicular height indicative signal H representative of the excessively low level of the vehicle body is output by the vehicular height sensor 32 upon turning ON of the ignition switch. Then, the height control program is started to be executed for starting adjustment of the fluid pressure in the working chamber 24L of the active cylinder 24.

Here, assuming the vehicular brake is not applied during the period between a time $t_0$ to $t_1$, then the answer at the step 1010 becomes negative. Therefore, the timer is started at the step 1012 at the time $t_0$. After expiration of the predetermined time, e.g. 2 sec., the fluid pressure in the working chamber 24L is increased in a rate of ΔP by the UP command output at the step 1020. At this time, since the road wheel is not locked, the actual vehicular height is raised according to increasing of the fluid pressure in the working chamber. At the time $t_1$, the vehicular brake is applied. By application of the brake at the time $t_1$, braking state indicative signal level turns into HIGH level at the step $t_1$. Therefore, the answer at the step 1010 becomes positive. Then, the process through the steps 1028 to 1034 is performed for deriving the error dependent control pressure $\Delta P_B$ based on the height error Δx at the time $t_1$. After the time $t_1$, the fluid pressure is maintained to be increased in a rate of ΔP until the fluid pressure is increased in a magnitude of $\Delta P_B$. At a time $t_3$, the fluid pressure in the working chamber reaches the maximum level. Then, the answer at the step 1038 becomes negative. Therefore, after the time $t_3$, height adjustment is disabled.

At times $t_4$ and $t_5$, the vehicular brake is temporarily released in a short period, e.g. shorter than 2 sec. In such a case, the answer at the step 1016 becomes negative. Therefore, in such a case, the process through the steps 1028 to 1044 is performed to permit height adjustment in the limited height adjustment range $\Delta P_B$.

On the other hand, at a time $t_6$, the brake is released to trigger the timer at step 1014. By releasing the brake, the wheel becomes free to rotate. As a result, the vehicular height is raised by the fluid pressure in the active cylinder which is increased during the period from $t_0$ to $t_6$. After expiration of the given period, e.g. 2 sec., the answer at the step 1016 becomes positive to permit height adjustment in a feedback manner. Therefore, the vehicular height is raised toward the target height $H_N$. When the vehicular height is raised across the lower limit $H_L$, the answer at the step 1004 becomes positive. Therefore, height adjustment operation is terminated.

As can be appreciated herefrom, according to the shown embodiment, since the pressure adjustment range is limited to a magnitude derived on the basis of the height error between the actual height and the target height, while the road wheel is locked by application of the brake, overshooting of height adjustment which leads to an abrupt of sudden change of the vehicular height upon releasing of the road wheel from the locking state, can be successfully prevented.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For instance, the active suspension system can be constructed in various fashions and control of the active suspension can be done in various manners. For example, reference is made to the following co-pending applications, publications and patents.

U.S. patent application Ser. No. 052,934, filed on May 22, 1989, which has now been issued as U.S. Pat. No. 4,903,983, on Feb. 27, 1990:

U.S. patent application Ser. No. 059,888, filed on June 9, 1987, corresponding European Patent Application has been published as First Publication No. 02 49 209:

U.S. patent application Ser. No. 060,856, filed on June 12, 1987, corresponding European Patent Application has been published as First Publication No. 02 49 227:

U.S. patent application Ser. No. 060,909, filed on June 12, 1987, now U.S. Pat. No. 4,909,534:

U.S. patent application Ser. No. 060,911, filed on June 12, 1987, which has now been issued as U.S. Pat. No. 4,801,115, on Jan. 31, 1989:

U.S. patent application Ser. No. 176,246, filed on Mar. 31, 1988, now U.S. Pat. No. 4,888,696, the corresponding European Patent Application has been published as First Publication No. 02 85 153:

U.S. patent application Ser. No. 178,066, filed on April 5, 1988, which has now been issued as U.S. Pat. No. 4,848,790, on July 18, 1989, and the corresponding European Patent Application has been published as First Publication No. 02 86 072:

U.S. patent application Ser. No. 167,835, filed on Mar. 4, 1988, which has now been issued as U.S. Pat. No. 4,865,348, on Sept. 12, 1989:

U.S. patent application Ser. No. 244,008, filed on Sept. 14, 1988, now U.S. Pat. No. 4,938,499:

U.S. patent application Ser. No. 255,560, filed on Oct. 11, 1988, now U.S. Pat. No. 4,943,084:

U.S. patent application Ser. No. 266,763, filed on Nov. 3, 1988, now U.S. Pat. No. 4,967,360 corresponding European Patent Application has been published under First Publication No. 03 18 721:

U.S. patent application Ser. No. 261,870, filed on Oct. 25, 1988:

U.S. patent application Ser. No. 263,764, filed on Oct. 28, 1988, now U.S. Pat. No. 4,905,152 corresponding European Patent Application has been published under First Publication No. 03 14 164:

U.S. patent application Ser. No. 277,376, filed on Nov. 29, 1988, now U.S. Pat. No. 4,919,440 corresponding European Patent Application has been published under First Publication No. 03 18 932:

U.S. patent application Ser. No. 303,338, filed on Jan. 26, 1989, now U.S. Pat. No. 4,948,169 corresponding German Patent Application has been published under First Publication No. 39 02 312:

U.S. patent application Ser. No. 302,252, filed on Jan. 27, 1989:

U.S. patent application Ser. No. 310,130, filed on Mar. 22, 1989, now U.S. Pat. No. 4,973,079 corresponding German Patent Application has been published under First Publication No. 39 04 922:

U.S. patent application Ser. No. 327,460, filed on Mar. 22, 1989, now U.S. Pat. No. 4,911,469 corresponding German Patent Application has been published under First Publication No. 39 10 030:

U.S. patent application Ser. No. 303,339, filed on Jan. 26, 1989, now U.S. Pat. No. 4,948,165:

U.S. patent application Ser. No. 331,602, filed on Mar. 31, 1989, now U.S. Pat. No. 4,911,468:

U.S. patent application Ser. No. 331,653, filed Mar. 31, 1989, now U.S. Pat. No. 4,911,470 corresponding German Patent Application has been published under First Publication No. 39 10 445:

U.S. patent application Ser. No. 364,477, filed on June 12, 1989, corresponding European Patent Application has been published under First Publication No. 03 45 816:

U.S. patent application Ser. No. 365,468, filed on June 12, 1989, corresponding European Patent Application has been published under First Publication No. 03 45 817:

U.S. patent application Ser. No. 422,813, filed on Oct. 18, 1989, now U.S. Pat. No. 4,961,595:

U.S. patent application Ser. No. 454,785, filed on Dec. 26, 1989, now U.S. Pat. No. 4,982,979:

The disclosures of the hereabove listed prior applications, publications and patents are herein incorporated by reference. Furthermore, any two or more prior proposed inventions may be combined in practical implementation of an active suspension system. Therefore, any combination of the above mentioned prior proposed inventions are to be deemed as disclosed due to incorporation by reference as a part of the present invention.

What is claimed is:

1. An active suspension system for a vehicle body and a suspension member for rotatably supporting a road wheel, comprising:
   a hollow cylinder, disposed between said vehicular body and said suspension member, a piston being disposed within the hollow interior space of said hollow cylinder for thrusting movement therein, said hollow cylinder and said piston cooperating to define a working chamber in said hollow cylinder;
   a fluid circuit system including a pressurized fluid source for supplying and draining pressurized fluid to and from said working chamber;
   a pressure control valve, connected to said working chamber, for adjusting fluid pressure within said working chamber;
   first means for monitoring vehicular height to determine a vehicular body height level and for producing a first signal indicative of said vehicle body height level;
   second means for monitoring a vehicular condition in which a road wheel is locked for preventing rotation and for producing a second signal indicative of said vehicular condition;
   third means for monitoring vehicle speed and for producing a third signal indicative of said vehicle speed; and
   controlling means for controlling said pressure control valve to adjust the fluid pressure in said working chamber to adjust the height level of the vehicular body toward a target height level, the controlling means having; fourth means, responsive to said first signal, for deriving a difference between the detected height level and the target height level; fifth means for deriving a value of correction of the hydraulic pressure in said working chamber so as to compensate for said difference between the detected height level and said target height level; and sixth means, responsive to said second and third signals, for limiting an amount of change of the hydraulic fluid pressure in said pressure working chamber to a value less than the corrected hydraulic pressure value derived by said fifth means when said second means detects the road wheel lock condition and said third means detects a zero vehicle speed.

2. An active suspension system as set forth in claim 1, wherein said controlling means is responsive to a termination of said second signal to control said pressure control valve to adjust said vehicular height level to be within said predetermined height range after expiration of a predetermined period of time.

3. An active suspension system as set forth in claim 1, wherein said second means produces said second signal when said vehicle speed is zero and a brake is applied.

4. An active suspension system comprising:
   a hollow cylinder, disposed between a vehicular body and a suspension member, for rotatably supporting a road wheel, a piston being disposed within the hollow interior space of said hollow cylinder for thrusting movement therein, said hollow cylinder and said piston cooperating to define a working chamber in said hollow cylinder;
   a fluid circuit system including a pressurized fluid source for supplying and draining pressurized fluid to and from said working chamber;
   a pressure control valve, connected to said working chamber, for adjusting fluid pressure within said working chamber;
   a first means for monitoring a vehicular height to produce a vehicular body height level and for producing a first signal indicative of said vehicular body height level;
   second means for monitoring a vehicular condition in which a road wheel is locked for preventing rotation and for producing a second signal indicative of said vehicle condition; and
   third means for monitoring vehicle speed and for producing a third signal indicative of said vehicle speed;
   controlling means, active in a normal state mode under an absence of said second signal, for controlling said pressure control valve to adjust the fluid pressure in said working chamber to adjust the height level of the vehicular body, said controlling means being response to the presence of said second signal to be active in a parking state mode, to derive a pressure adjustment range on the basis of said second signal and a target height level, the controlling means having; fourth means, responsive to said first signal, for deriving a difference between the detected height level and the target height level; fifth means for deriving a value of correction of the hydraulic pressure in said working chamber so as to compensate for said difference between the detected height level and said target height level; and sixth means, responsive to said second and third signals, for limiting an amount of change of the hydraulic fluid pressure in said pressure working chamber to a value less than the corrected hydraulic pressure value derived by said fifth means when said second means detects the road wheel lock condition and said third means detects a zero vehicle speed.

5. An active suspension system as set forth in claim 4, wherein said controlling means is responsive to termination of said second signal to switch control modes from said parking state mode to said normal state mode to control said pressure control valve to adjust said vehicular height level to be within said predetermined height range after expiration of a predetermined period of time.

6. An active suspension system as set forth in claim 5, wherein said second means produces said second signal when said vehicle speed is zero and a brake is applied.

7. A height control system for an automotive vehicle having a vehicular body and a suspension member for rotatably supporting a road wheel, comprising:
a hollow cylinder disposed between said vehicular body and said suspension member, a piston being disposed within the hollow interior space of said hollow cylinder for thrusting movement therein, said hollow cylinder and said piston cooperating to define a working chamber in said hollow cylinder;
a fluid circuit system including a pressurized fluid source for supplying and draining pressurized fluid to and from said working chamber;
a pressure control valve, connected to said working chamber, for adjusting fluid pressure within said working chamber;
a first means for monitoring a vehicular height to produce a vehicular body height level and for producing a first signal indicative of said vehicular body height level;
second means for monitoring a vehicular condition in which a road wheel is locked for preventing rotation and for producing a second signal indicative of said vehicular condition; and
third means for monitoring vehicle speed and for producing a third signal indicative of said vehicle speed;
controlling means, active in a normal state mode under an absence of said second signal, for controlling said pressure control valve to adjust the fluid pressure in said working chamber to adjust the height level of the vehicular body, said controlling means being responsive to the presence of said second signal to be active in a parking state mode, to derive a pressure adjustment range on the basis of said second signal and a target height level, the controlling means having; fourth means, responsive to said first signal, for deriving a difference between the detected height level and the target height level; fifth means for deriving a value of correction of the hydraulic pressure in said working chamber so as to compensate for said difference between the detected height level and said target height level; and sixth means, responsive to said second and third signals, for limiting an amount of change of the hydraulic fluid pressure in said pressure working chamber to a value less than the corrected hydraulic pressure value derived by said fifth means when said second means detects the road wheel lock condition and said third means detects a zero vehicle speed.

8. A height control system as set forth in claim 7, wherein said controlling means is responsive to termination of said second signal to switch control modes from said parking state mode to said normal state mode to control said pressure control valve to adjust said vehicular height level to be within said predetermined height range after expiration of a predetermined period of time.

9. An active suspension system as set forth in claim 8, wherein said second means produces said second signal when said vehicle speed is zero and a brake is applied.

10. The system as set forth in claim 1, wherein said target height level is selected from one of a single range of height levels.

11. The system as set forth in claim 4, wherein said target height level is selected from one of a single range of height levels.

12. The system as set forth in claim 7, wherein said target height level is selected from one of a single range of height levels.

13. A method of controlling an active vehicle suspension system of a vehicle, said suspension system having a suspension member rotatably supporting a road wheel, a hollow cylinder located between said vehicle body and said suspension member and having a working chamber located therein, and a fluid circuit system supplying fluid to and draining fluid from said working chamber via a pressure control valve, said method comprising the steps of:
(A) monitoring vehicular height;
(B) monitoring said road wheel and determining whether or not said road wheel is locked;
(C) monitoring the speed of said vehicle and determining whether or not said vehicle speed is zero; and
(D) controlling said control valve to adjust the fluid pressure in said working chamber to adjust the height level of said vehicle body toward a target height level, said step of controlling said control valve comprising the steps of
deriving a difference between the monitored vehicle height level and said target height level;
deriving a value of correction of the hydraulic pressure level in said working chamber needed to compensate for the said difference; and
limiting an amount of change of the hydraulic fluid pressure in said working chamber to a value smaller than said corrected value whenever said road wheel is in a locked condition and said vehicle speed is zero.

14. The method as set forth in claim 13, wherein said step of controlling said control valve to adjust the height level of said vehicle body toward a target height level comprises the step of selecting said target height level from one of a single range of height levels.

* * * * *